(12) United States Patent
Lawrence

(10) Patent No.: US 9,946,723 B2
(45) Date of Patent: Apr. 17, 2018

(54) DATA EMBEDDING IN RUN LENGTH ENCODED STREAMS

(71) Applicant: INTEL CORPORATION, Santa Clara, CA (US)

(72) Inventor: Sean Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 14/293,620

(22) Filed: Jun. 2, 2014

(65) Prior Publication Data

US 2015/0347442 A1 Dec. 3, 2015

(51) Int. Cl.
 *G06K 9/38* (2006.01)
 *G06F 17/30* (2006.01)

(52) U.S. Cl.
 CPC .. *G06F 17/30153* (2013.01); *G06F 17/30156* (2013.01)

(58) Field of Classification Search
 CPC .......... G06T 2201/0052; H04N 19/467; G06F 17/30153
 See application file for complete search history.

(56) References Cited

U.S. PATENT DOCUMENTS

| | | | | |
|---|---|---|---|---|
| 5,748,244 A * | 5/1998 | Jung | ................ | H04N 19/176 375/240.18 |
| 6,373,960 B1 * | 4/2002 | Conover | ............... | G06T 1/0035 348/412.1 |
| 2002/0085737 A1 * | 7/2002 | Kitamura | .............. | G06T 1/0021 382/100 |
| 2003/0123661 A1 * | 7/2003 | Oh | .......................... | G06T 1/005 380/210 |
| 2006/0023880 A1 * | 2/2006 | Seroussi | ............... | G06T 1/0028 380/203 |
| 2007/0053438 A1 * | 3/2007 | Boyce | ................... | G06T 1/0042 375/240.24 |
| 2008/0209220 A1 * | 8/2008 | Oostveen | .............. | G06T 1/0064 713/176 |
| 2009/0034634 A1 * | 2/2009 | Van Der Vleuten | . | H04N 19/503 375/241 |
| 2009/0080689 A1 * | 3/2009 | Zhao | ..................... | G06T 1/0035 382/100 |
| 2011/0050995 A1 * | 3/2011 | Ozawa | ................... | H04H 20/18 348/468 |

OTHER PUBLICATIONS

Fridrich et al., "Lossless Data Embedding with File Size Preservation", 2004.*

(Continued)

*Primary Examiner* — Neveen Abel Jalil
*Assistant Examiner* — Dawaune Conyers
(74) *Attorney, Agent, or Firm* — Green, Howard & Mughal LLP

(57) ABSTRACT

One or more system, apparatus, method, and computer readable media for embedding supplemental data into a compressed data stream to form a supplemented compressed data stream. In embodiments, supplemental data is embedded at a run-length encoded (RLE) compression stage. In embodiments, supplemental data is extracted from a supplemented RLE stream to recover supplemental data and/or reconstruct the compressed data stream from which the supplemental data is extracted.

16 Claims, 11 Drawing Sheets

(56) References Cited

OTHER PUBLICATIONS

Hernandez-Avalos et al., "Video Watermarkering Scheme resistant to MPEG Compression", 2009.*
Wang et al., "Efficient Integration of Watermarking With MPEG Compression", 2004.*
Arturo San Emeterio Campos, "Run Length Encoding", Barcelona, Jul. 24, 1999, 3 pages. web page available at: http://www.arturocampos.com/ac_rle.html.
Jung et al., "The Hiding of Secret Data Using the Run Length Matching Method", Lecture Notes in Computer Science, vol. 4496, Springer-Verlag Berlin Heidelberg, 2007, pp. 1027-1034.
Agaian et al., "Run Length Based Steganography for Binary Images", Lecture Notes in Computer Science, vol. 3776, Springer-Verlag Berlin Heidelberg, 2005, pp. 481-484.
Rababaa, "Colored Image-in-Image Hiding", 10th International Conference, Feb. 24-28, 2009, 12 pages.
Tsai, Piyu, "Data Hiding for Index-based Images Using Overlapping Codeword Clustering and Run Length Concept", International Journal of Innovative Computing, Information and Control, vol. 6, No. 6, Jun. 2010, 1 page.
Jung, Ki-Hyun, "Improved Exploiting Modification Direction Method by Modulus Operation", International Journal of Signal Processing, Image Processing and Pattern, vol. 2, No. 1, Mar. 2009, pp. 79-88.
Lin et al., "A Modified Run-length Image Data Hiding for High Embedding Capacity", Fifth International Conference on Information Assurance and Security, 2009, pp. 673-676.

* cited by examiner

DATA EMBEDDING IN RUN LENGTH ENCODED STREAMS

BACKGROUND

Data is often archived or transmitted in a compressed format to minimize system resources required for storage or handling of the data. Compression encoding may be lossless or lossy. Lossless compression is utilized in applications where original data must be recovered. Where it is sufficient for a decoding process to recover an approximation of the original data, lossy compression codecs are often utilized for the sake of greater compression rates.

Run length encoding (RLE) is a technique for removing data redundancy/repetition and is employed by many standardized lossless and lossy compression algorithms now ubiquitous in the digital world. RLE specifies a length of a repetitive "run" and the run-ending "level." A form of RLE is often used for example in fax transmissions and for binary bitmap images. RLE may also be utilized within a lossless compression stage of a lossy compression pipeline. In lossy compression, a raw data stream (e.g., pictures and sound in an A/V codec compliant with MPEG-4, H.264 AVC, etc.) may be sampled and segmented (e.g., into macroblocks), transformed (e.g., through discrete cosine transform), and quantized. The resulting coefficients may then be entropy encoded. The entropy encoding stage may employ a lossless compression algorithm to remove as much redundancy as possible from the input data (e.g., DCT block). Many standardized forms of entropy encoding permit the use of RLE because after quantization a significant number of the higher order AC coefficients of a DCT block may be zeros. A run of zeros within sparse DCT data can then be represented by a "run-level" pair specifying the length of a zero run and the run-ending non-zero level (e.g. non-zero DCT coefficient). Run-level pairs output by the RLE encoder may then be statistically coded (e.g., via a Huffman table) where the length of the code symbol assigned is a function of the frequency a run-level pair appears. If this is the final operation in the encoding process, the result is the compressed data stream.

There are many instances where it is useful to embed supplemental data into a compressed data stream. Depending on the application (e.g., data security, digital rights management (DRM), user experience enhancement, etc.), such supplemental data may be overtly or covertly embedded into a compressed data stream. Covert data embedding, often referred to as "data hiding," includes watermarking and steganography. Techniques and systems to embed supplemental data into a compressed data stream, particularly those compatible with existing lossy and lossless compression codecs, are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
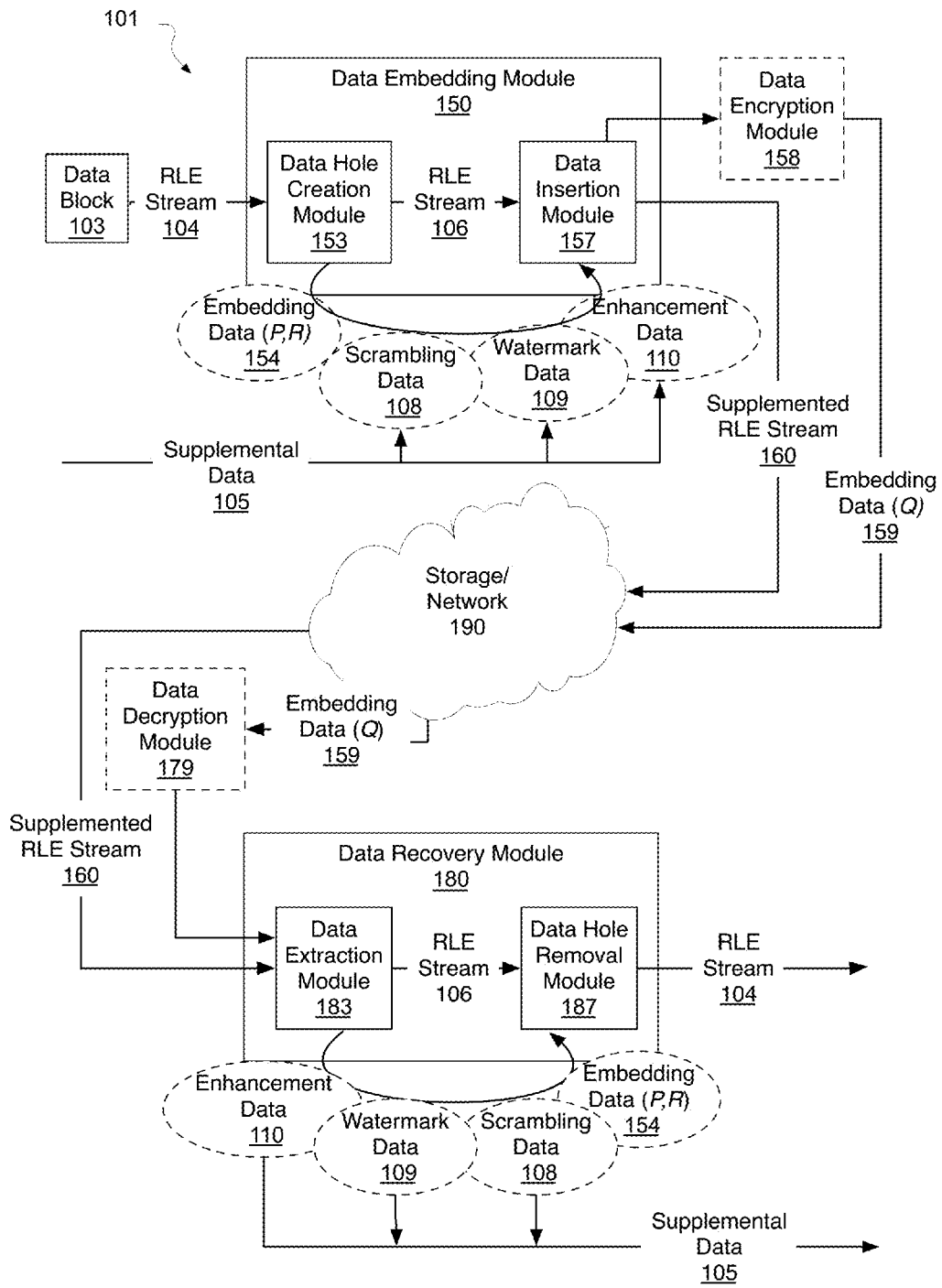
FIG. 1 is a functional block diagram illustrating a system for embedding data in an RLE data stream and recovering the embedded data and/or the RLE data stream, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below to embed supplemental data into a compressed data stream to generate a supplemented compressed data stream. In exemplary embodiments, supplemental data is embedded at an RLE compression stage. Supplemental data may further be extract at an RLE decompression stage.

FIG. 1 is a functional block diagram illustrating a system 101 for embedding data in an RLE data stream 104 and recovering the RLE data stream 104 and/or recovering the embedded data from the RLE data stream 104, in accordance with embodiments. On a compression and/or transmit side, RLE data stream 104 is output by any known run-level encoder, which may be serve as the only compression stage in an upstream pipeline, or may be one of many compression stages. In exemplary embodiments, the input RLE data stream run-length encodes an input data stream having a predetermined structure or format. For example, sequences within RLE data stream 104 may encode units of input data, such as, but not limited, to pages or data blocks 103. Each data block 103 is associated with N data elements which are themselves coded elements (e.g., discrete cosine transform coefficients) conforming to a predetermined format that may be defined in a standardized codec (e.g., BiM, MPEG-4 Part 17, WAV, AIFF, MPEG-4 ACC Par 3 subpart 4, H.263, H.264, MPEG-1 Part 2, H.262/MPEG-2 Part 2, MPEG-4 Part 2, H.264/MPEG-4 AVC, OpenAVS, High Efficiency Video Coding (HEVC) H.265, etc.). Each data block 103 may be run-length encoded by a variable number of run-level pairs sequenced within RLE data stream 104, depending upon the nature of the input data stream (e.g., frequency of level shifts, etc.), and depending upon the RLE data compression algorithm utilized.

RLE data stream 104 is received by data embedding module 150. In certain embodiments, data embedding module 150 is implemented as fixed function logic circuitry configured to create holes in an input RLE stream and insert supplemental data into those holes. In other embodiments, data embedding module 150 is implemented by programmable logic circuitry executing software instructions configuring the programmable logic circuitry to create data holes in an input RLE stream and to insert supplemental data into those data holes.

Data embedding module 150 includes a data hole creation module 153 to form data holes allowing insertion of supplemental data in the RLE data stream 104 at a constant data length and data. Data hole creation module 153 outputs a modified RLE data stream 106 that includes the data holes. Data hole creation module 153 further outputs embedding data 154, which characterizes the holes created in RLE data stream 104. Data embedding module 150 further receives supplemental data 105. As described in more detail below, the supplemental data 105 may take many different forms, such as, but not limited to, rights management/security data (e.g., scrambling data 108), hidden data (e.g., watermark data 109), as well as any form of enhancement data 110 (e.g., captioning text) that might otherwise be sent out-of-band of RLE stream 104 or as metadata for RLE data stream 104. Data insertion module 157, communicatively coupled to data hole creation module 153, receives modified RLE stream 106 and inserts elements of supplemental data 105 into the data holes of modified RLE stream 106 based on embedding data 154. Embedding data 154 may also be inserted into the data holes of RLE stream 106. Data insertion module 157 outputs supplemented RLE stream 160, which is a composite of supplemental data 105 and modified RLE stream 106. Supplemented RLE stream 160 may then be further encoded and/or passed to storage/network 190. Storage/network 190 may include any conventional local memory (e.g., RAM, disk, etc.) or cloud storage, for example. Storage/network 190 may include any conventional communication network (wireless/wired LAN/WAN, etc.), as a further example. Data insertion module 157 may also output embedding data 159, which characterizes how supplemental data 105 has been inserted into modified RLE stream 106, facilitating subsequent extraction of supplemental data 105. Embedding data 159 may be stored or transmitted by storage/network 190 in association with supplemented RLE stream 160. In certain embodiments, embedding data 159 is encrypted by encryption module 158 using any suitable data encryption technology.

On a decompression and/or receive side, data recovery module 180 receives supplemented RLE stream 160, for example from storage/network 190. In certain embodiments, data recovery module 180 is implemented as fixed function logic circuitry configured to remove supplemental data and data holes from a supplemented RLE stream. In other embodiments, data recovery module 180 is implemented by programmable logic circuitry executing software instructions configuring the programmable logic circuitry to remove supplemental data and data holes from a supplemented RLE stream.

Data recovery module 180 further includes data extraction module 183, which takes supplemented RLE stream 160 and embedding data 159 as inputs. Embodiments including encryption module 158 further include data decryption module 179, which decrypts embedding data 159 before passing the decrypted embedding data to data extraction module 183. Data extraction module 183 is to locate and remove supplemental data 105 from supplemented RLE stream 160 based on the embedding data 159. With the embedded data removed, data extraction module 183 outputs a recovered RLE stream 106 to data hole removal module 187, which is to reconstruct RLE stream 104 based on embedding data 154 characterizing the data holes in RLE stream 106. Supplemental data 105 (e.g., enhancement data 110, watermark data 109, scrambling data 108, etc.) may also be output for subsequent use or simply discarded, depending on the application, as described further below.

Figure 2A:
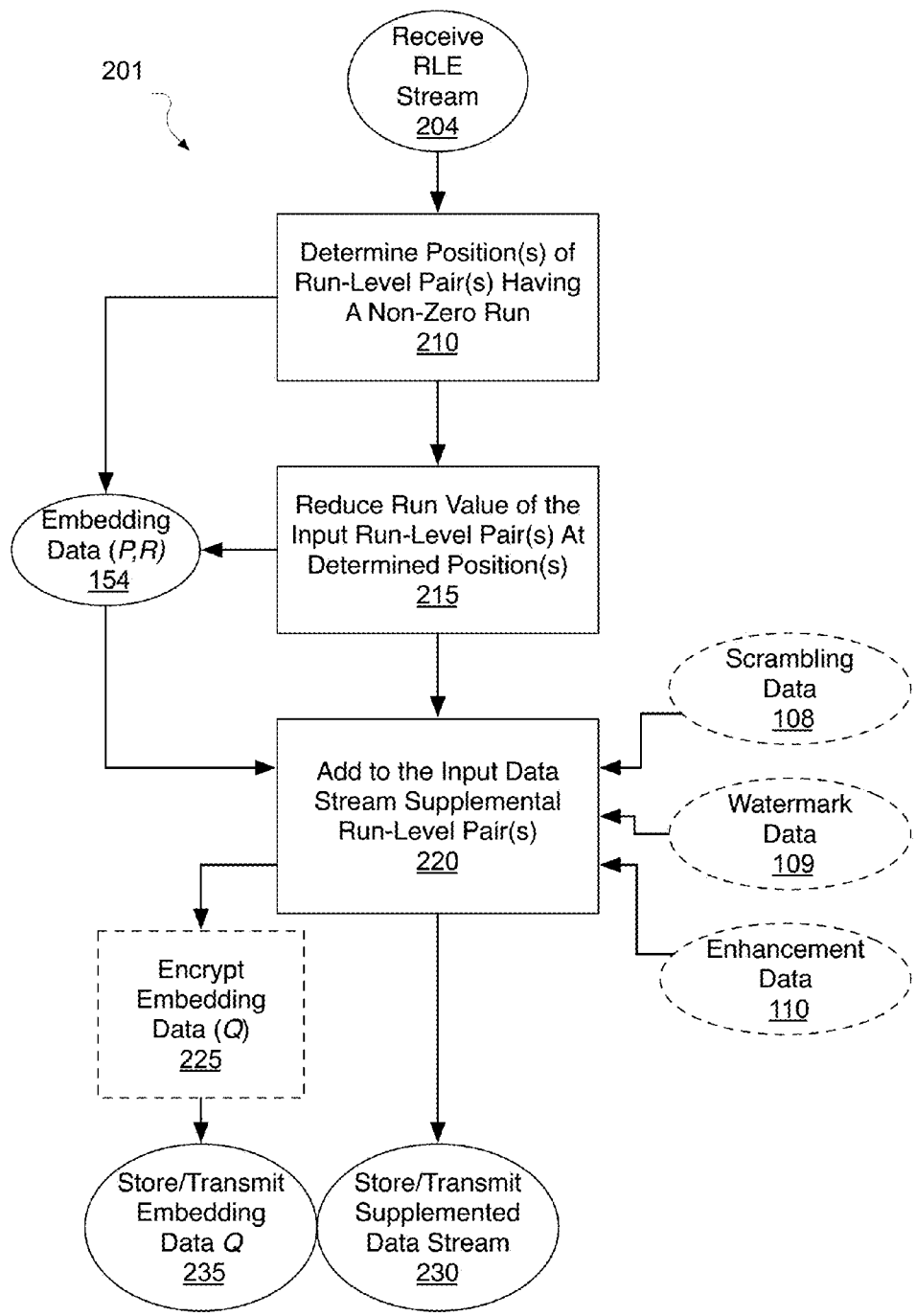
FIG. 2A is a flow diagram illustrating a method for embedding data in an RLE data stream, in accordance with an embodiment.

FIG. 2A is a flow diagram illustrating a method 201 for embedding data in an RLE data stream, in accordance with an embodiment. In one exemplary embodiment, method 201 is performed by data embedding module 150 (FIG. 1). Method 201 begins at operation 204 with receiving or accessing an input RLE data stream (e.g., RLE stream 104 in FIG. 1) having a run-level pair set S encoding N elements of a data block.

Continuing with FIG. 2 at operation 210, one or more position of the S run-level pairs having a non-zero run are identified in the input RLE stream 104. Operation 210 may be performed by data hole creation module 153 (FIG. 1), for example. At operation 210, a run-level pair set X may be determined along with an indicator $P_i$ of a corresponding position within the input RLE stream 104 for each run-level pair $X_i$. Run-level pair selection may be based on a predetermined random or deterministic selection algorithm, or rule. In one exemplary embodiment where an RLE data stream includes non-zero levels separated by zeros, positions of run-level pairs having non-zero runs of zeros are determined at operation 210. However, as the run value(s) themselves may vary depending on the format of the RLE data, non-zero runs of ones, and/or non-zero runs of any character ending with a level switch may be identified in alternate embodiments. In further embodiments, a more restrictive run threshold may be applied (e.g., a run greater than 2, 4, 6, etc.).

Run-level pairs meeting a quantitative search criteria may be further filtered, for example through random or periodic selection. In other embodiments, selection of a run-level pair is further predicated upon a significance of the data element(s) for an individual data unit (e.g., block 103) that a run-level pair encodes. For example, a run-level pair may be selected only if the pair is encoding a data element within a predetermined range of positions or locations associated with a threshold significance level within the encoded data unit. In one such embodiment, only those run-level pairs that have a threshold run size (e.g., greater than zero run of zeros) and encode data elements of a significance below a predetermined significance threshold (i.e., the "less significant" locations according to the encoded data block) are selected. As described further elsewhere herein, such an embodiment is well suited to data hiding applications, like watermarking and steganography, where it is advantageous for a supplemented RLE stream to run-length decode to an approximation of the individual data unit that has few (if any) user-perceptible artifacts. In a second such embodiment, only those run-level pairs that have a threshold run size and encode data elements of a significance above a predetermined significance threshold (i.e., "more significant" locations according to the encoded data unit) are selected. As described further elsewhere herein, such an embodiment is well suited to data scrambling/security applications, such as digital right management (DRM), where it is advantageous for a supplemented RLE stream to run-length decode to an approximation of the encoded data unit that has many user-perceptible artifacts. The embedding data 154 characterizing the locations of the run-level pairs determined based on the selection criteria at operation 210 includes the set P of position indicators. The position indication set P may be stored in any conventional manner (e.g., registers, FIFO buffer, CAM, etc.) for subsequent use.

Method 201 proceeds to operation 215 where the run value of each run-level is reduced for each pair determined at operation 210. Operation 215 may be performed by data hole creation module 153 (FIG. 1), for example. Reducing the run values opens corresponding number of spaces or "holes" in data stream 104, allowing for subsequent embedding of additional data that is also run-level encoded without losing correspondence between the run-level encoded pairs in data stream 104 and the encoded data block (e.g., block 103). Referring to FIG. 2, a run value for any given run-level pair determined at operation 210 may be reduced by any amount down to the minimum allowable run value (e.g., 0). Each run-level pair within the set X of selected run-level pairs may be reduced by an equal or differing amount. For example, all pairs with the set X may be reduced by one, enabling one supplemental data level to be embedded for each of the pairs in the set X. As another example, all pairs within the set X that were determined to have a run-value of at least two, may be reduced by two, enabling two supplemental data run-level pairs to be embedded for each of the pairs in the set X.

In embodiments, an indication of the amount by which the run value is reduced for each of the pairs in set X at the hole position indicator set P within the RLE stream 104 is stored to memory as a data set R. After operation 215 therefore, sets P and R are stored in association with each other (e.g., as embedding data 154) to characterize the locations of the run-level pairs determined based on the selection criteria at operation 210, and the amount(s) by which the run values of these pairs has been reduced. The run value reduction(s) set R may again be stored in any conventional manner (e.g., registers, FIFO buffer, CAM, etc.) for subsequent use. With certain run values reduced at operation 215, the RLE stream 104 (FIG. 1) is output as a modified stream 106 that includes run-level pair set S', some of which have a reduced run value relative to run-level pair set S in RLE stream 104. Because of the data holes introduced, modified stream 106 would not be expected to run-length decode exactly back to the data block 103.

Referring to FIG. 2, method 201 continues at data embedding operation 220 where supplemental data is dynamically added into the spaces created at operation 214. Operation 220 may be performed by data insertion module 157 (FIG. 1), for example. The supplemental data may be any data and can be independent of the data block encoded by RLE stream 104. In the exemplary embodiments illustrated in FIG. 2A, one or more of scrambling data 108, watermark data 109, or enhancement data 110 may be received as a supplemental data input. The nature of the supplemental data itself is dependent on the intended application and therefore varies with embodiment. For example, in a steganography embodiment, the supplemental data may encode a predetermined secret message. In a watermarking embodiment, the supplemental data may encode a predetermined digital signature or watermark. In a DRM or scrambling embodiment, the supplemental data may be determined by an algorithm designed to significantly affect data elements of a particular data unit (e.g., supplemental data may be dynamically derived from elements in block 103). Notably, in certain embodiments, the embedding data 154 generated by operations 210 and 215 (FIG. 2) is embedded into the modified RLE stream as supplemental data at operation 220. Hence, a supplemented RLE stream output at operation 220 may include at least some of the embedding data needed to recover input RLE stream 104.

Supplemental data is inserted into the modified RLE stream to augment the set S' of run-level pairs. In the exemplary embodiment, the supplemental data is inserted in run-level format (e.g., scrambling data 108, watermark data 109, or enhancement data 110 is an RLE encoded supplemental data stream). The supplemental RLE data includes a set D of supplemental run-level pairs, each of which can be inserted in any location(s) within the modified RLE stream 106 to form supplemented data stream 160 having a set T of supplemented run-level pairs. A set Q of data stream position indicators is also determined at operation 220 to identify where the set D is inserted among the run-level pair set S'. Position indicator set Q is stored to memory (e.g., as embedding data 159 in FIG. 1). Data stream insertion position indicators Q may again be stored in any conventional manner (e.g., registers, FIFO buffer, CAM, etc.) for subsequent use.

In embodiments, supplemental data is embedded so as to not affect the format or decoding standard associated with an individual input data unit (e.g., block 103). The number of RLE pairs inserted into supplemented RLE data stream 160 is dependent on the number of data holes created at operation 215 (FIG. 2). In the exemplary embodiment, the number of RLE pairs inserted at operation 220 may be equal to the total number of data holes created at operation 215. Operation 220 then outputs a supplemented RLE data stream 160 (FIG. 1) having a set T of run-value pairs that will RLE decode into the correct number of elements associated with data block 103 originally run-length encoded by RLE stream 104. As such, the supplemented RLE stream 160 maintains data length consistency with the input RLE stream 104. However, with at least some run values (e.g., zeros) replaced with supplemental data (e.g., non-zeros), the supplemented run-level pairs will decode into a data block altered from the original state unless the decode process is able to utilize the embedding data to extract the supplemental data and rebuild the RLE stream 104.

In an embodiment, supplemental run-level pairs may be inserted at positions within the modified RLE stream 106 following a predetermined algorithm, for example through a random or periodic positioning (e.g., run-level pairs in set D alternating with run-level pairs S') algorithm. In other embodiments, positioning of a supplemental run-level pair into the modified RLE stream 106 is predicated upon significance of the data element(s) the supplemental run-level pair encodes within supplemented RLE stream 160 with respect to the individual data unit (e.g., block 103) that is ultimately to be decoded from supplemented RLE stream 160. For example, a supplemental run-level pair may be inserted into a position where the pair would be utilized by a standard-compatible decoder to recover data elements within a predetermined range of data positions associated with a threshold significance level within the encoded data unit (e.g., block 103). In one such embodiment, supplemental run-level pairs are inserted at positions, which when combined with the run value reduction set R, encode data elements having a significance below a predetermined significance threshold (i.e., the "less significant" locations according to the encoded data unit). As described further elsewhere herein, such an embodiment is well suited to data hiding applications, like watermarking and steganography, where it is advantageous for the supplemented RLE stream 160 to run-length decode into an approximation of the encoded data unit that has few (if any) user-perceptible artifacts. In an alternative embodiment, supplemental run-level pairs are inserted at positions, which when combined with the run value reduction set R, encode data elements of a significance above a predetermined significance threshold (i.e., "more significant" locations according to the encoded data unit). As described further elsewhere herein, such an embodiment is well suited to data scrambling/security applications, such as digital right management (DRM), where it is advantageous for the supplemented RLE stream 160 to run-length decode to an approximation of the encoded data unit that has many user-perceptible artifacts. In further embodiments, a given supplemental run-level pair may be inserted at multiple positions within the modified RLE stream 106 as a means of providing supplemental data redundancy, which may increase embedded data resiliency.

Supplemented RLE stream 160 may or may not RL decode directly into a reasonable approximation of the encoded data unit (e.g., block 103). Therefore, recovering the embedding data at the decompression and/or receive side so that the RLE stream 104 may be reconstructed from supplemented RLE stream 160 before performing a run-length decode may be more or less important to recovering the original RL encoded data unit. For example, it may be more important to recover RLE stream 104 in a data scrambling embodiment than it would be for a data-hiding embodiment). In certain embodiments therefore, at least some of embedding data is encrypted to restrict recovery of RLE stream 104. In one such embodiment at least the data stream insertion position indicator set Q is encrypted using any suitable encryption technique at encryption operation 225. Encryption operation 225 may be performed by data encryption module 158 (FIG. 1), for example. Embedding data 154, if not embedded into supplemented RLE stream 160, may be similarly encrypted (e.g., Q, P, R all encrypted). In exemplary embodiments, the encryption algorithm applied at operation 225 is distinct from any encryption that might be applied to supplemented RLE stream 160 (FIG. 1). In further embodiments, conventional encryption of supplemented RLE stream 160 is not performed in reliance of the supplemental data embedding process rendering supplemented data stream 160 adequately scrambled as a result of the high bit significance of the run value reduction set R and/or of the supplemental run-level pair position indicators Q. Such embodiments may reduce data encryption overhead because the embedding data (e.g., position indicator set Q) may be a significantly smaller data set than that of RLE stream 106. Hence, encrypting only embedding data may provide a very light weight method for DRM of an input RLE stream because it does not involve encrypting the entire input RLE stream. The only encryption is of a secondary stream that specifies how a primary RLE stream has been modulated/scrambled.

Referring to FIG. 2, method 201 continues with storing and/or transmitting the supplemented data stream at operation 230. Operation 230 may entail any known downstream processing that would be suitable for the input RLE stream received at operation 204. Hence, further encoding of the run-level pairs in the supplemental data stream, such as entropy encoding, may be performed using any desired technique. Transmission at operation 230 may likewise by any known technique (e.g., following standard wireless or wired protocols). Any embedding data not embedded into the supplemented data stream may likewise be stored and/or transmitted at operation 235. In one embodiment, embedding data (e.g., position indicator set Q) is transmitted as a secondary stream out of band of the primary data stream channel employed at transmission operation 230. In one exemplary embodiment, embedding data is transmitted at operation 235 as user data and/or as metadata associated with the supplemented data stream transmitted at operation 230. Notably, out-of-band embedding data need only be sent at the beginning of the primary data stream transmission or at regular intervals, and does not need to be synchronized with the content of the supplemented data stream.

Figure 2B:
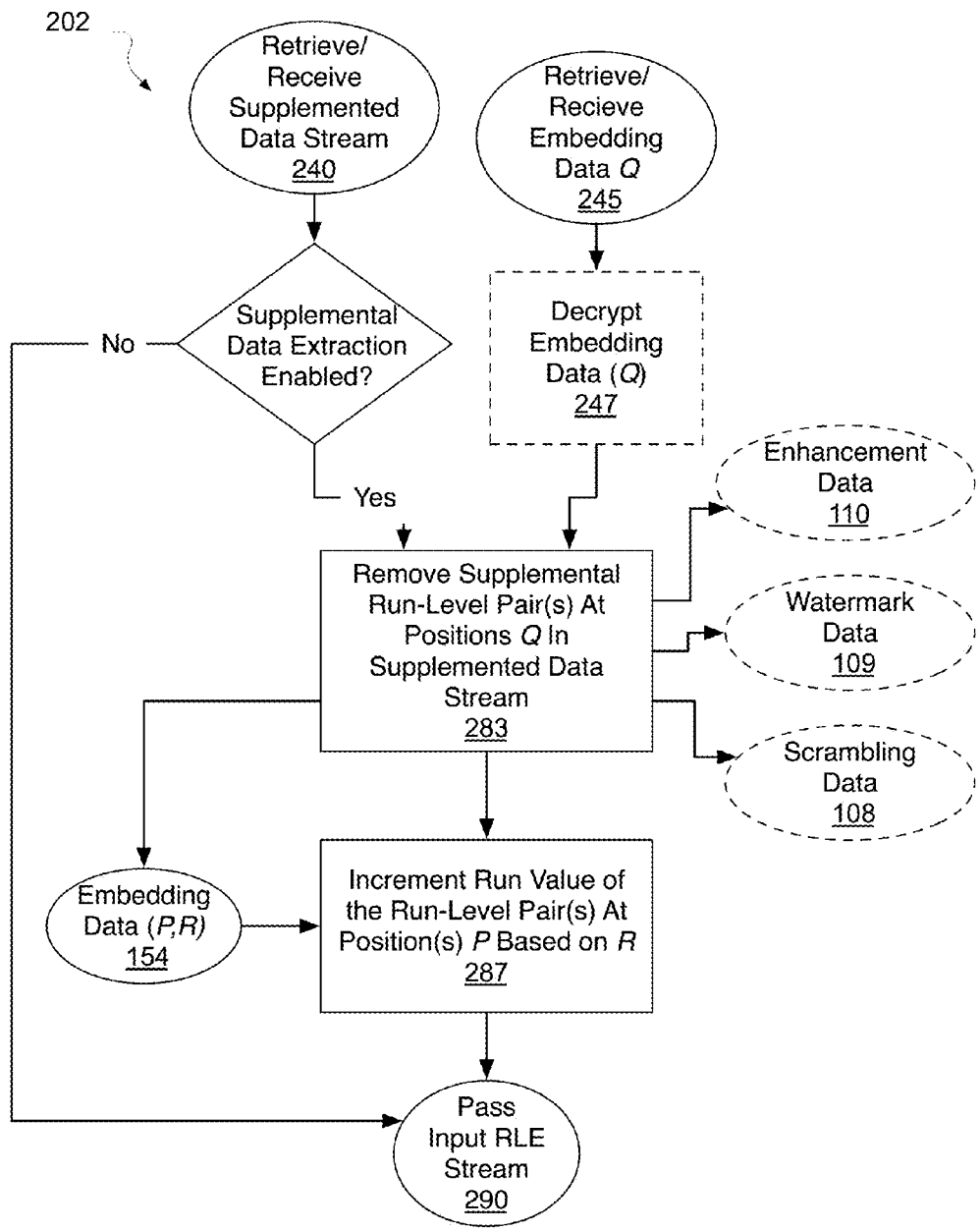
FIG. 2B is a flow diagram illustrating a method for recovering data embedded in an RLE data stream, in accordance with an embodiment.

FIG. 2B is a flow diagram illustrating a method 202 for recovering an RLE data stream from a supplemented RLE data stream and/or recovering data embedded in a supplemented RLE data stream, in accordance with an embodiment. In one exemplary embodiment, method 202 is performed by data recovery module 180 (FIG. 1).

Method 202 begins with retrieving, accessing, or otherwise receiving a supplemented RLE data stream at operation 240. If the decoder and/or receiver implementing operation 240 is not enabled and/or configured to extract supplemental data from a supplemented RLE stream (e.g., lacks data recovery module 180 illustrated in FIG. 1), then the supplemented RLE data stream is passed at operation 290 as an input RLE stream to any conventional RL decoder. Any known run-length decoding algorithm may be performed, for example to arrive at elements of a data unit conforming with a predetermined format that may be defined in a standard-compliant codec (e.g., compatible with BiM, MPEG-4 Part 17, WAV, AIFF, MPEG-4 ACC Par 3 subpart 4, H.263, H.264, MPEG-1 Part 2, H.262/MPEG-2 Part 2, MPEG-4 Part 2, H.264/MPEG-4 AVC, OpenAVS, High Efficiency Video Coding (HEVC) H.265, etc.). Without extracting the supplemental data and reconstructing the input RLE stream, the data unit element derived from the output of operation 290 is a more or less altered version of input data unit (e.g., data block 103 in FIG. 1) run-length encoded on a compression and/or transmission side. However, as described above in the context of FIG. 2A, because the supplemented RLE data stream maintains run-length encoding of the N data elements, any decoder complying with compatible standardized codec will be able to decode the supplemented stream directly, without extraction of the supplemental data and without removal of the data holes created in method 201.

In embodiments where a decoder is enabled and/or configured to extract supplemental data from a supplemented RLE stream (e.g., lacks data recover module 180 illustrated FIG. 1), the supplemental run-level pairs are removed at operation 283 (FIG. 2). Operation 283 is performed based on embedding data received at operation 245. Embedding data may be receive for example on a secondary channel out of band of the supplemented data stream received at operation 240. For certain embodiments where embedding data received at operation 245 is encrypted, method 202 includes decryption operation 247. Any decryption algorithm may be applied at operation 247 as a function of the encryption that may have been applied to the embedding data. Depending on the implementation, decrypted embedding data may include one or more of the position indicator set Q, run value reduction set R, or hole position indicator set P. At operation 283, supplemental run-level pairs are removed from the supplemented RLE stream at positions identified by indicator set Q and a supplemental RLE data stream including one or more of scrambling data 108, watermark data 109, or enhancement data 110 is output. Depending on the application, the extracted supplemental data may have intrinsic value (e.g., embedding data P, R, hidden message, or enhancement data) that is recovered, or the supplemental data may simply be discarded as stuffing. Operation 283 may be performed by data extraction module 183 (FIG. 1), for example to reconstruct modified RLE stream 106 that is passed to data hole removal module 187.

Continuing with FIG. 2 at operation 287, the RLE stream output by operation 283 is further processed to remove data holes by incrementing run values of the run-level pairs at hole position indicator set P based on run value reduction set R. Depending on the embodiment, P and R may be output by operation 283 as extracted supplemental data, or simply passed from operation 245 where it was received. Operation 283 therefore reconstructs run-level pair set S from a set S'. This reconstructed RLE stream (e.g., RLE stream 104 in FIG. 1) is then passed as an input to an RLE decoder to recover all elements of a data unit (e.g., data block 103) in a loss-less manner.

Figure 3:
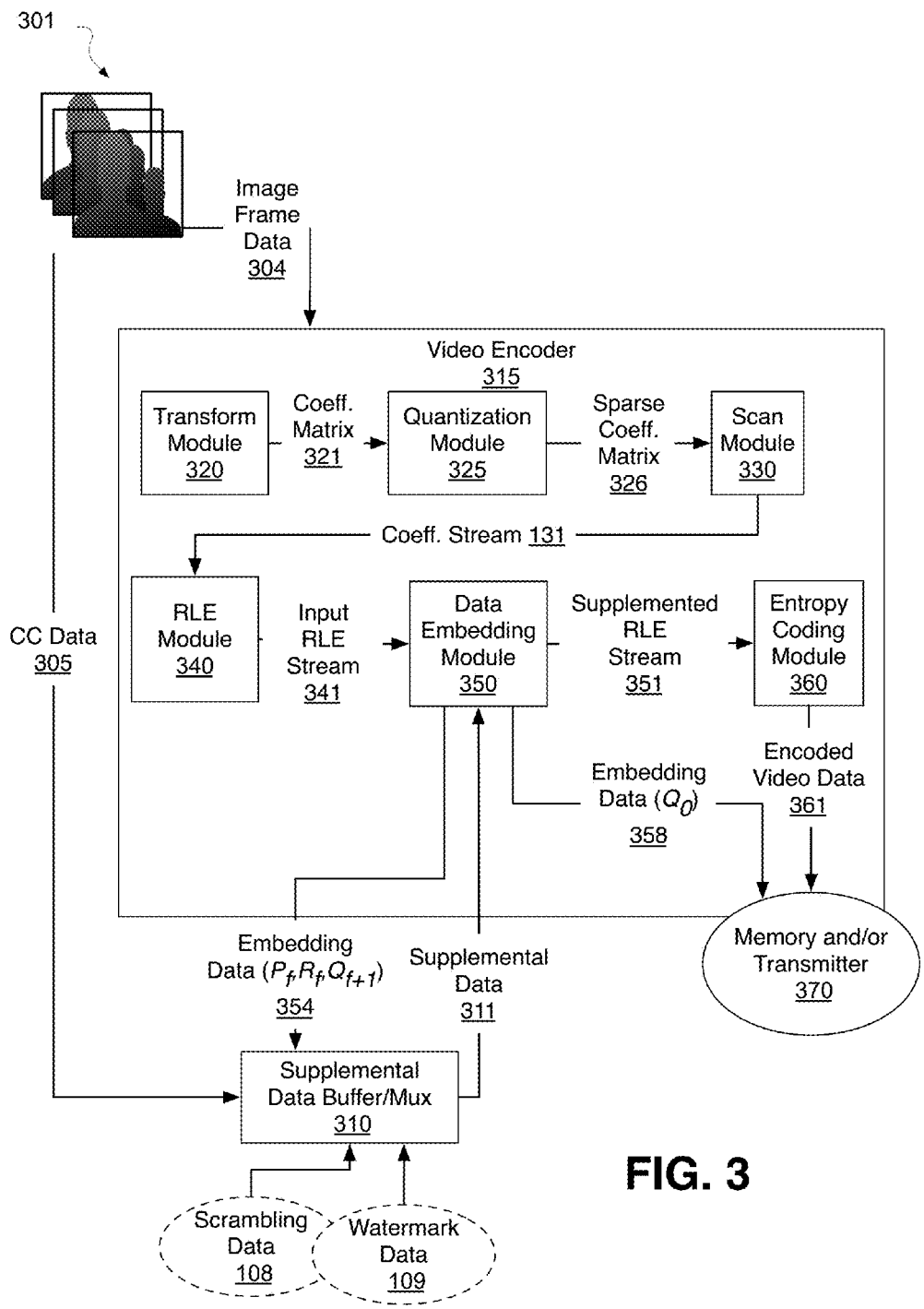
FIG. 3 is a functional block diagram illustrating an enhanced video coding system including a video encoder with a data-embedding module, in accordance with an embodiment.

FIG. 3 is a functional block diagram illustrating an enhanced video coding system 301 including a video encoder 315 with a data-embedding module 350, in accordance with an embodiment. Enhanced video coding system 301 further includes provisions for embedding closed caption (CC) data 305 in an RLE stream containing image frame data 304. In one embodiment, one or more of the modules illustrated in FIG. 3 is implemented as one or more blocks of logic circuitry (i.e., IP cores), which may be fixed function or user/driver programmable. In another embodiment, one or more of the modules illustrated in FIG. 3 is implemented by with a general processor logic circuitry executing software instructions as one or more processing threads.

CC data 305 is one form of enhancement data that may be embedded as supplemental data for enhancing an end user's experience. In this exemplary embodiment, run-level formatted elements of CC data are synchronized with digital video simply by embedding the CC data at the RLE level within the N elements associated with a quantum of video data. With such macroblock and/or frame tagging, it is then straightforward to determine a CC data-embedding rate (e.g., CC data elements needed per slice or macroblock) to synchronize with the audio layer of an A/V data stream of a given video frame rate. Such CC data embedding embodiments may be particularly advantageous as is currently no widely adapted solution for synchronization CC data with digital video. The RLE-level data embedding techniques and systems described herein may also be applied to other forms of enhancement data that may benefit from the sub-frame level data synchronization provided by the embodiments described herein.

Video encoder 315 includes transform module 320 coupled to quantization module 325, further coupled to scan module 330. RLE module 340 is coupled between scan module 330 and data embedding module 350. Data embedding module 350 is further coupled to supplemental data buffer and/or multiplexer 310 and outputs to entropy coding module 380, which is further coupled to an encoded video stream sink, such as a memory (storage) and/or stream transmitter 370.

Transform module 320 may apply known transform techniques (e.g., DCT) to frames, slices, and/or macroblocks to spatially decorrelate the macroblock data and output transform coefficient matrices 321, where each matrix associated with one or more frame/slice, and/or macroblock (e.g., a DCT block). Those of skill in the art may recognize that transform module 320 may sub-divide 16×16 macroblocks into 4×4 or 8×8 blocks before applying appropriately sized transform matrices, for example. Prior to transformation, motion estimation, spatial and/or other temporal prediction may also be performed following any known practice as embodiments herein are not limited in the respect.

Quantization module 325 is then to quantize the transform coefficients in matrices 321 in response to one or more quantization control parameter that may be changed, for example, on a per-macroblock basis. For example, for 8-bit sample depth the quantization control parameter may have 52 possible values. Such quantization may generate sparse coefficient matrices 326 with many zeros (e.g., in matrix positions associated with high frequency data).

Scan module 330 is to scan the coefficient matrices 326 using various known scan order schemes (e.g., corner zigzag) to generate a string of transform coefficients or characters 131. The transform coefficient sequence may then be streamed out to RLE module 340, which in the exemplary embodiment reduces runs of zeros into run-level pairs, each representing a number of zeros terminated with a non-zero transform coefficient or character.

Data embedding module 350 creates holes in RLE stream 341 using one or more of the operations introduced above in the context of FIG. 2A. Elements of CC data 305 temporally associated with image frame data 304 are queued in supplemental data buffer 310 and embedded into the porous RLE stream 341 to generate supplemented RLE stream 351, which is output to entropy coding module 380. Additional codec formatting elements such as macroblock type, intra prediction modes, motion vectors, reference picture indexes, residual transform coefficients, and so forth may also be provided to RLE module 340, and/or to entropy coding module 110, which may in turn output statistically coded video data 361 based on supplemented RLE stream 351.

Data embedding module 350 is further to output embedding data 354, which in the exemplary embodiment includes position indicator set $P_f$ and run value reduction set $R_f$ determined for the input RLE stream 341 associated with a current frame, slice, or macroblock. Embedding data 354 further includes embedded data position indicator set $Q_{f+1}$ associated with a subsequently streamed frame, slice or macroblock. In this exemplary embodiment, because all the embedding data P, R, and Q is embedded as supplemental data within supplemental RLE stream 351, data embedding module 350 need only to further output embedded data position indicator set $Q_0$ associated with an initial frame or macroblock as embedding data 358 that is out of band of encoded video data 361 output by entropy coding module 360. Embedded data position indicator sets for all subsequent frames or macroblock can then be embedded into a preceding frame or marcoblock.

Figure 4:
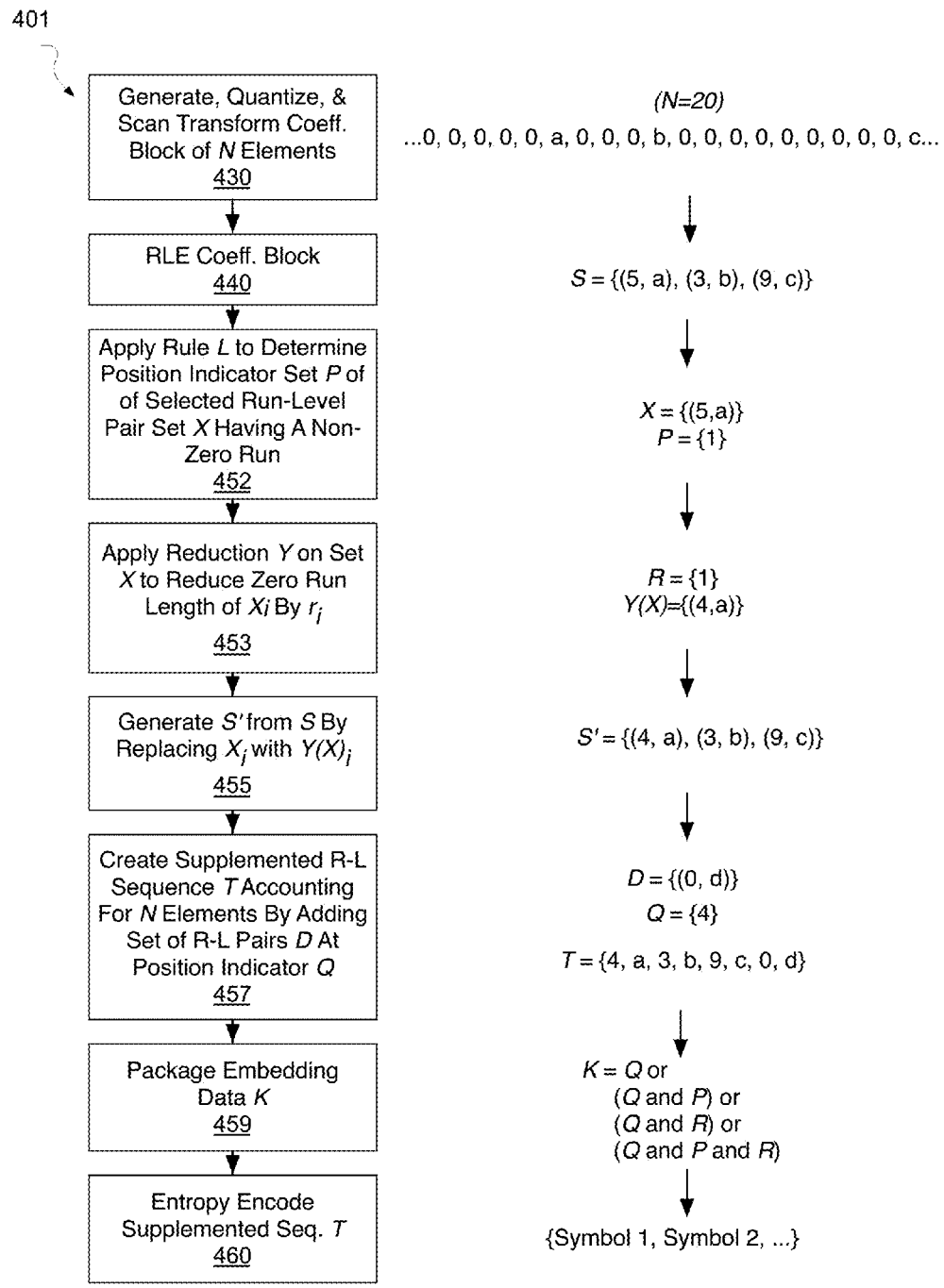
FIG. 4 is a flow diagram illustrating a method for embedding data in an encoded video data stream, in accordance with an embodiment.

FIG. 4 is a flow diagram illustrating a method 401 for embedding data in an encoded video data stream, in accordance with an embodiment. The pseudo code provided in method 401 may be performed, for example, by data embedding module 350 in FIG. 3. As such, method 401 may be implemented by fixed function IP cores within embedding module 350, or by programmable logic circuitry executing one or more instruction processing threads.

Referring to FIG. 4, method 401 begins at operation 430 where a frame, slice or macroblock is transformed, quantized, and scanned using any known technique to generate a stream of associated N elements (e.g., including the 20 elements {0, 0, 0, 0, 0, a, 0, 0, 0, b, 0, 0, 0, 0, 0, 0, 0, 0, 0, c}). At operation 440, the N elements are RLE encoded into run-level pair set S={(5,a), (3,b), (9,3)}. At operation 452, a selection rule L is applied to determine position indicator set P associated with selected run-level pair set X. In the example, rule L specifies certain non-zero runs and results in X={(5,a)} and P={1}. At operation 453, a reduction rule Y is applied to selected set X to reduce the zero run length of $X_i$ by $r_i$, so that R={1} and Y(X)={(4,a)} in the example. At operation 455, modified run-level sets S' are generated from set S by replacing $X_i$ with $Y(X_i)$, with S'={(4,a), (3,b), (9,c)} in the example. At operation 457, a supplemented run-level sequence T is generated to account for the N elements by adding a supplement run-level set D at position indicators Q. Supplemented run-level set D may be for example be a run-level formatted element of CC data (e.g., {(0,d)}) that is temporally associated with a frame containing a macroblock to which the N elements run-length encoded at operation 430 pertain. The set of insertion points Q in T where D is added is stored (e.g., as Q={4}), and the supplemented run-level pair set T (e.g., {4, a, 3, b, 9, c, 0, d}) is streamed out. Embedding data K is packaged at operation 459, where K is the set of insertion points Q (e.g., for a first encoded macroblock), K is the set of insertion points Q and set of hole position indicators P, or K is the set the of insertion points Q, set of hole position indicators P, and set of run value reductions R. Method 401 then concludes with entropy encoding the supplemented sequence T (e.g., {symbol 1, symbol 2, . . . }).

Figure 5:
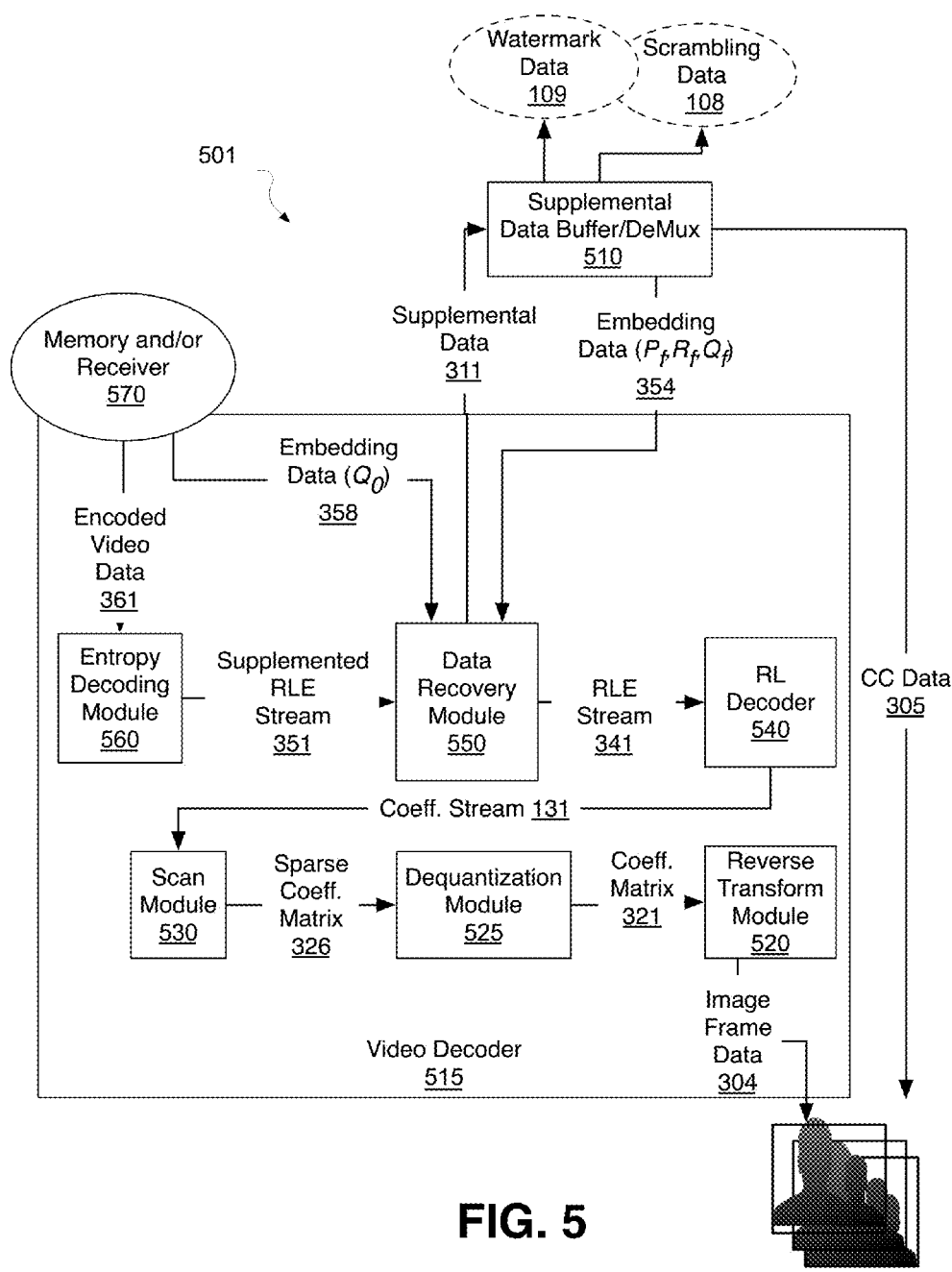
FIG. 5 is a functional block diagram illustrating an enhanced video decoding system including a video decoder with an embedded data recovery module, in accordance with an embodiment.

FIG. 5 is a functional block diagram illustrating an enhanced video decoding system 501 including a video decoder 515 that has an embedded data recovery module 550, in accordance with an embodiment. Enhanced video decoding system 501 further includes provisions for extracting closed caption (CC) data 305 from an RLE stream containing image frame data 304.

Video decoder 515 includes a memory (storage or buffer) and/or stream receiver 570 coupled to an entropy decoder 560. Storage/receiver 570 and entropy decoder 560 are further coupled to a data recovery module 550. Data recovery module 550 is further coupled to run-length decoder 540 and a supplemental data buffer/de-multiplexer 510. Run-length decoder 540 is further coupled to scan module 530 outputting to dequantization module 525, which further outputs to reverse transform module 520. Reverse transform module 520 outputs a final approximation of image frame data 304, for example for output to a display. In one embodiment, one or more of the modules illustrated in FIG. 5 is implemented as one or more blocks of logic circuitry (i.e., IP cores), which may be fixed function or programmable by software instructions to execute one or more processing threads.

Entropy decoding module 560 receives encoded video data 361 and implements an entropy decoding compatible with the entropy encoding performed by entropy coding module 360 (FIG. 3) to generate supplemented RLE stream 351 (FIG. 5).

Data recovery module 550 receives supplemental RLE stream 351 and implements the inverse of the data embedding operation implemented by data embedding module 350 (FIG. 3) to extract supplemental data 311 (e.g., data set D) based on the insertion position indicator set Q received as embedding data 358 (e.g., $Q_0$ for a first frame) or as embedding data 354 (e.g., $Q_f$) accessed from supplemental data buffer/demux 510. One or more of the operations introduced above in the context of FIG. 2B may be utilized to extract supplemental data 311. In the exemplary embodiment supplemental data 311 includes at least CC data 305, and may further include scrambling data 108, and/or watermark data 109.

Data embedding module 350 is further to reconstruct input RLE stream 341 associated with a current frame, slice, or macroblock by incrementing zero run values at position indicator set $P_f$ by run value reduction set $R_f$. RL decoder 540 then applies a suitable run-length decoding algorithm to RLE stream 341 to unpack the coefficient stream 131, which is converted to sparse coefficient matrix 326 by scan module 530. Dequantization module 525 then generates transform coefficient matrix 321 (e.g., a DCT block) which is operated on by reverse transform module 520 following any known technique to generate decoded image frame data 304. CC data 305 extracted as supplemental data is temporally associated with image frame data 304 for enhancement of the image frame data 304, for example through output to a display device in synchronization with frame data 304.

Figure 6:
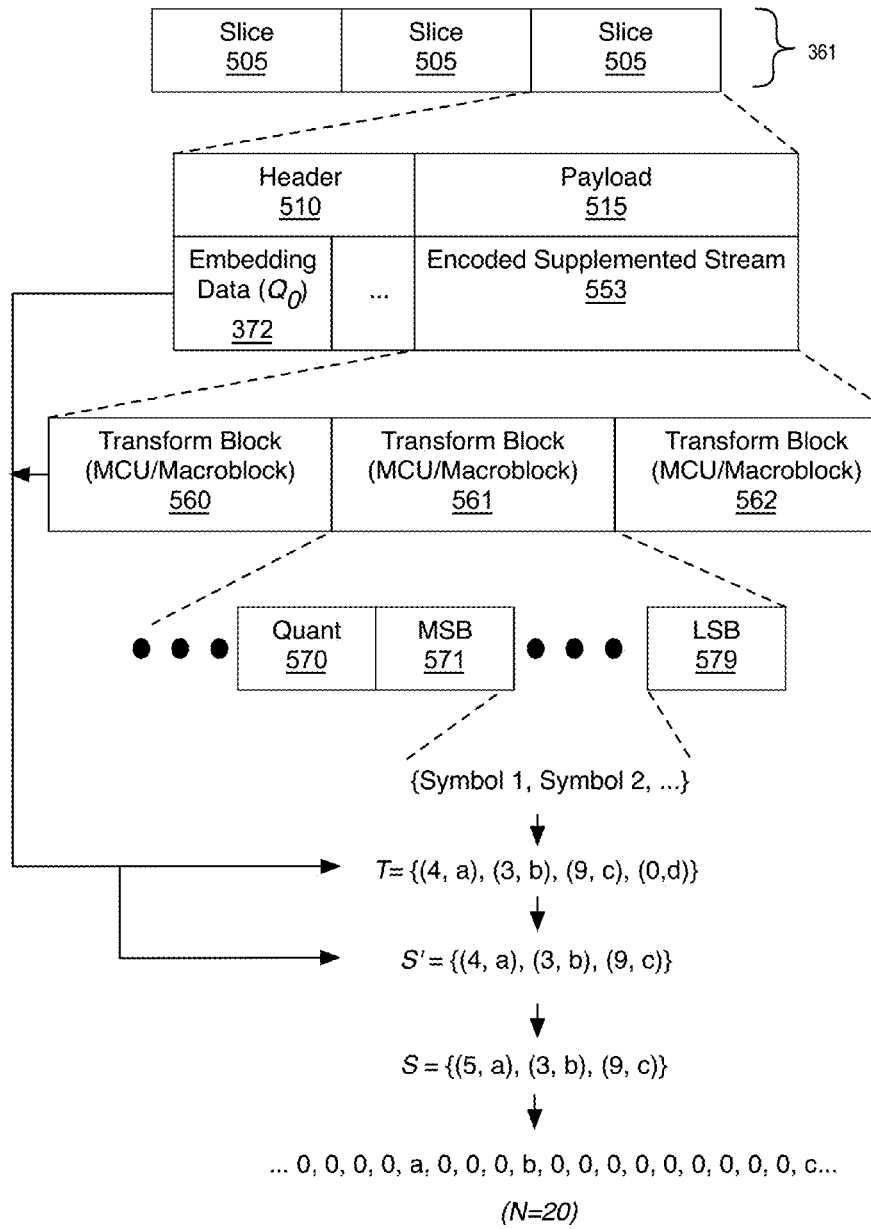
FIG. 6 is a schematic of data stream processing as a method for recovering embedded data from an encoded video data stream is performed, in accordance with an embodiment.

FIG. 6 is a schematic of data stream processing as a method for recovering embedded data from an encoded video data stream is performed, in accordance with an embodiment. In this example, encoded video data 361 is associated with a plurality of slices 505. A slice 505 is further associated with header 510 and payload 515. In this illustrative embodiment, header 510 includes embedding data 362 (e.g., first frame insertion position indicator set $Q_0$) utilized by a data recovery module to extract embedded supplemental data from a supplemented RLE stream 553 included within payload 515. Encoded supplemented stream 553 is associated with one or more transform block 560, 561, 562 (e.g., an MCU for a JPEG codec, or macroblock for an MPEG codec). Transform block 561 is further associated with codec parameters (e.g., quantization parameter 570) and a sequence of bits between a most significant bit (MSB) 571 and a least significant bit (LSB) 579 for an encoded DCT block. The bit sequence is further associated with entropy encoded symbols (e.g., symbol 1, symbol 2). An entropy decoder generates a supplemented RLE stream including supplemented RL encoded pair set T derived, at least in part, from symbol 1 and symbol 2. Continuing the example of FIG. 4, set T={(4,a), (3,b), 9,c), (0,d)}. Supplemental data RLE pair set D is extracted leaving modified RLE pair set S'={(4,a), (3,b), (9,c)}. Run values are incremented to reconstruct RLE pair set S={(5,a), (3,b), (9,c)}, which is input into RLE decoder to recover the sequence {0, 0, 0, 0, a, 0, 0, 0, b, 0, 0, 0, 0, 0, 0, 0, 0, c} associated with the N elements of an encoded data unit.

As noted above, in certain embodiments RLE-level data embedding is utilized for either data-hiding or data-scrambling. Both applications leverage the advantageous property of a supplemented RLE stream remaining decodable by any decoder compatible with a standardized codec. Because a standardized encoded stream can be decode even after RLE-level supplementation following embodiments herein, the effect the embedding process has on the encoded data may be purposefully modulated either for the sake of hiding data within the decodable stream in a manner imperceptible to an end user, or for the sake of scrambling the decodable stream in a manner apparent to an end user.

Figure 7A:
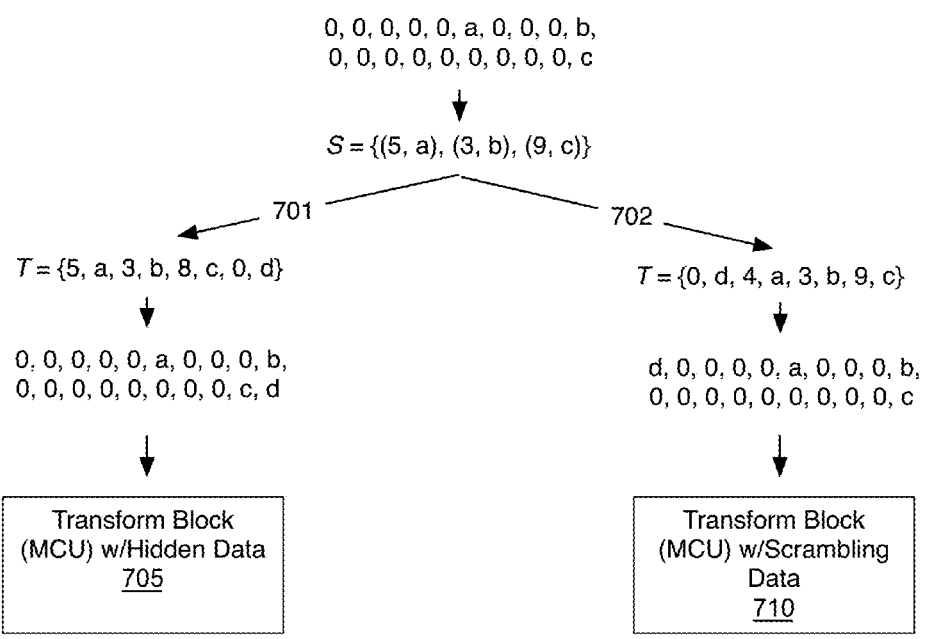
FIG. 7A is a schematic illustrating data stream processing for embedding data into a transform block, in accordance with scrambling data and hidden data embodiments.

FIG. 7A is a schematic illustrating data stream processing for embedding data into a transform block, in accordance with scrambling and hidden data embodiments. As shown, a sequence (e.g., {0, 0, 0, 0, a, 0, 0, 0, b, 0, 0, 0, 0, 0, 0, 0, 0, 0, c}) associated with the N elements of an encoded data unit (e.g., DCT block) is run-length encoded (e.g., S={(5,a), (3,b), (9,c)}) into run-level pairs. For a data-hiding embodiment 701, data holes are created in the less significant locations of the RLE stream per encoded DCT block. Data insertion points may further be determined so as to affect only low significant bit values, for example with the supplemented run-level pair set T={5, a, 3, b, 8, c, 0, d}. The supplemented stream, without extraction of the supplemented data, then run-length decodes to a sequence with only lower significant bits disrupted, for example to run-level pair set S={0, 0, 0, 0, 0, a, 0, 0, 0 b, 0, 0, 0, 0, 0, 0, 0, c, d}. With supplemental data embedded at bit position(s) of lesser significance, of MCU 760 for example, the run-level pair set S may be further decoded into an image in which the supplemental data is visually hidden from an end user. This example is applicable to most encoding standards such as MPEG2 and H.264 where the end of the stream corresponds to a low significant location and would not typically affect pixel values noticeably if decoded.

In certain hidden data embodiments, for example where the hidden data is a signature or watermark, data embedding may be made more resilient to attacks by randomizing the creation of data holes and insertion of supplemental data. Redundancy may also be introduced to the hole/insertion process for even more resiliency. Notably, as opposed to inserting watermark data in data streams before the data is RL encoded, which typically requires statistical and image processing techniques that are computationally intensive, the RLE-level data embedding embodiments described herein are very lightweight and do not require any statistical computation or image processing overhead.

In steganography embodiments, the insertion of data is likewise controlled so as to disguise the presence of supplemental data. In one such embodiment for example, secret data is inserted in a manner that impacts only coefficients of lesser (least) significance (high frequency coefficients) in a video macroblock. It may then be impossible to determine the hidden data content unless positions of the embedded data and/or locations of the holes is known. Furthermore, with hidden data inserted in the less significant coefficient positions, even the presence of hidden data, regardless of its content, may undetectable by an end user through visual inspection since the decoded macroblock would look very similar to the original.

As further illustrated in FIG. 7A, for encryption or DRM embodiments 702, data holes are created in the more significant locations of the RLE stream per encoded DCT block. Data insertion points may also be determined so as to affect the more significant bit values (e.g., low frequency coefficients of DCT block). For example with the supplemented run-level pair set T={0, d, 4, a, 3, b, 9, c}. The supplemented stream, without extraction of the supplemented data, then run-length decodes to a sequence with more significant bits disrupted, for example to run-level pair set S={d, 0, 0, 0, 0, a, 0, 0, 0, b, 0, 0, 0, 0, 0, 0, 0, 0, c}. With supplemental data embedded at bit position(s) of more significance, of an MCU 710 for example, the run-level pair set S may be further decoded into an image that appears to an end use as visibly scrambled version of the original data encoded into a macroblock. This example is applicable to most encoding standards such as MPEG2 and H.264 where the beginning of the stream corresponds to a more significant location, which would typically affect pixel values noticeably when decoded. Because the supplemented bitstream maintains standard stream format (e.g., maintains data length consistency), decoders that are not enabled to extract the embedded supplemental data will display the scrambled content.

FIGS. 7B, 7C, 7D, 7E, and 7F illustrate effects of recovering scrambling data and hidden data embedded into graphics data, as a function of the data embedding algorithm and access to the associated embedding data, in accordance with an embodiment.

Figures 7B, 7C, 7D, 7E, 7F:
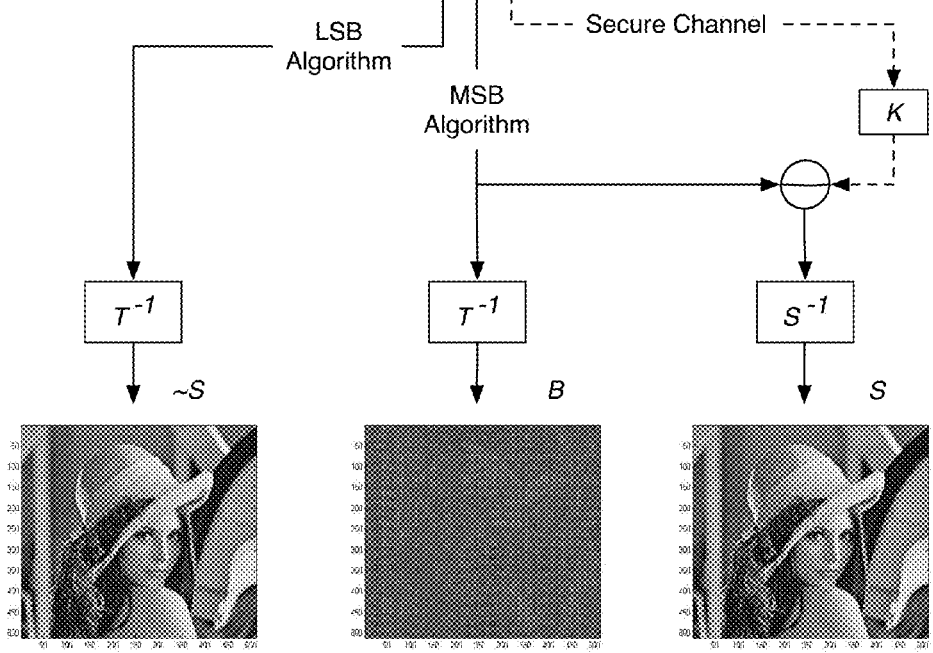
FIGS. 7B, 7C, 7D, 7E, and 7F illustrate effects of recovering scrambling data and hidden data embedded into graphics data as a function of the data embedding algorithm and accessibility of associated embedding data, in accordance with an embodiment.

FIG. 7B illustrates an original image. Watermark/encryption content D is illustrated in FIG. 7C. When content D is embedded as supplemental data following embodiments herein with only lesser significant bits affected, a decoding process recovers a good approximation ~S from the supplemented run-level pair set T. The image depicted in FIG. 7D is then generated with the embedded watermark of FIG. 7C completely hidden in the image. However, when the same content D is embedded as supplemental data following embodiments herein with more significant bits affected, the decoding process recovers a poor approximation B from the supplemented run-level pair set T. The distorted/scrambled image depicted in FIG. 7E is then generated. Where a decoder is enabled and/or configured to extract supplemental data and reconstruct an RLE stream, and embedded data set(s) K is provided or accessible (e.g., through a secure encrypted channel, etc.) to the decoder, the original run-level pair set S is recovered from supplemented run-level pair set T. The image depicted in FIG. 7F can then be generated, which is an approximation of the original image depicted in FIG. 7B limited only by conventional compression losses.

Figure 8:
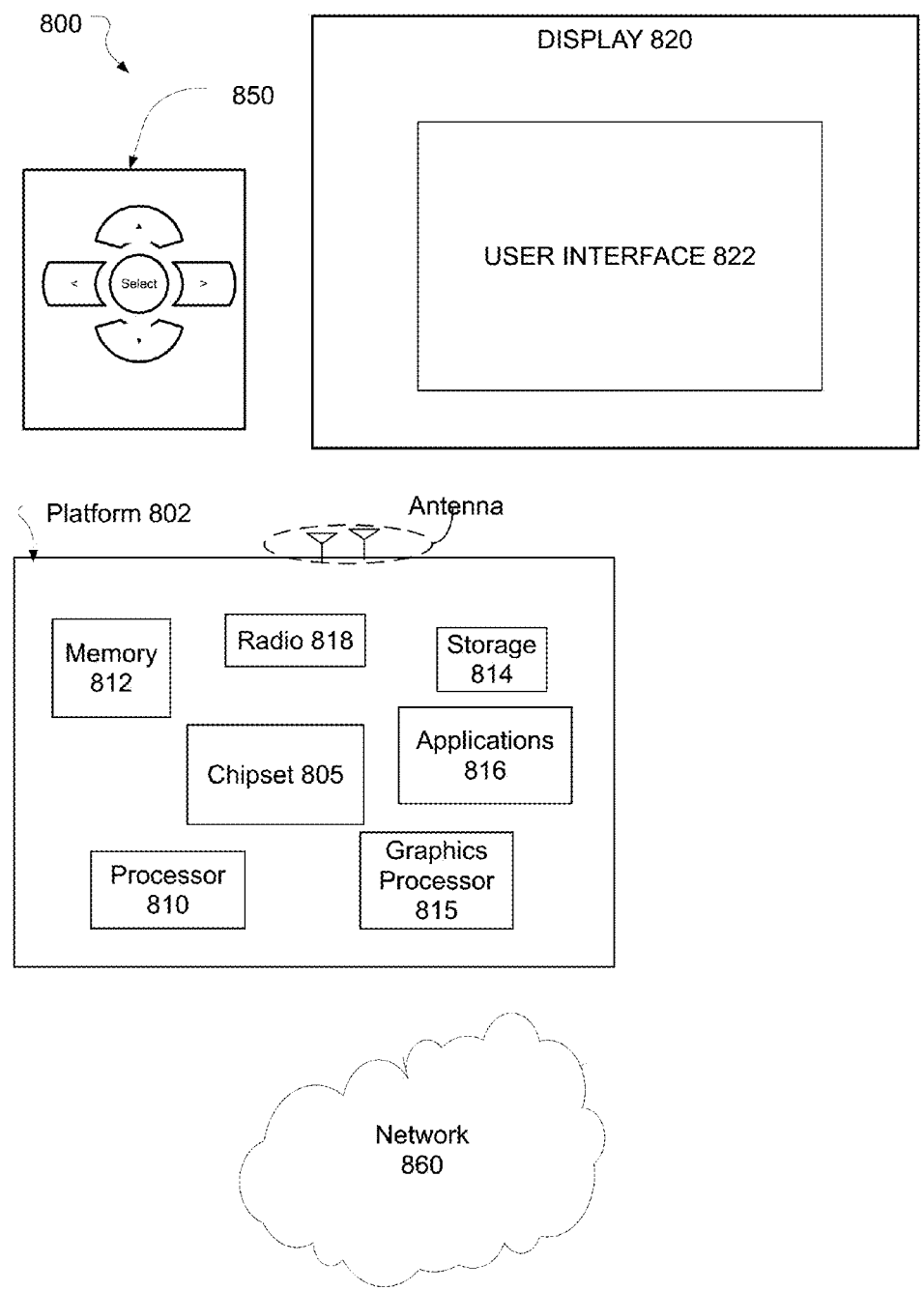
FIG. 8 is a diagram of an exemplary system employing one or more processor including logic to embed and/or recover data into/from an RLE stream, in accordance with one or more embodiment.

FIG. 8 is an illustrative diagram of an exemplary system 800, in accordance with embodiments. System 800 may implement all or a subset of the various functional blocks depicted in FIG. 1, FIG. 3, or FIG. 5. For example, in one embodiment a graphics processor 815 implements a graphics processing system that includes the data embedding module 150 and/or data recover module 180 of FIG. 1, for example having one or more of the features described elsewhere herein to perform any of the method described in the context of FIGS. 1-7. In one specific exemplary embodiment, graphics processor 815 includes fixed-function and/or programmable logic circuitry within at least one video encoding module, execution unit (EU), or other IP core, to embed data into a input video stream, or recover embedded data and/or reconstruct a video stream from encoded video data. System 800 may be a mobile device although system 800 is not limited to this context. For example, system 800 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

In embodiments, system 800 includes a platform 802 coupled to a HID 820. Platform 802 may receive captured personal media data from a personal media data services device(s) 830, a personal media data delivery device(s) 840, or other similar content source. A navigation controller 850 including one or more navigation features may be used to interact with, for example, platform 802 and/or HID 820.

In embodiments, platform 802 may include any combination of a chipset 805, processor 810, memory 812, storage 814, graphics processor 815, applications 816 and/or radio 818. Chipset 805 may provide intercommunication among processor 810, memory 812, storage 814, graphics processor 815, applications 816, or radio 818. For example, chipset 805 may include a storage adapter (not depicted) capable of providing intercommunication with storage 814.

Processor 810 may be implemented as one or more Complex Instruction Set Computer (CISC) or Reduced Instruction Set Computer (RISC) processors; x86 instruction set compatible processors, multi-core, or any other microprocessor or central processing unit (CPU). In embodiments, processor 810 may be a multi-core processor(s), multi-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 814 may include technology to increase the storage performance enhanced protection for valuable digital media when multiple hard drives are included, for example.

Graphics processor 815 may perform processing of images such as still or video media data for display, or perform general computing functions in a highly parallel manner. Graphics processor 815 may include one or more GPU, or visual processing unit (VPU), for example. An analog or digital interface may be used to communicatively couple graphics processor 815 and display 820. For example, the interface may be any of a High-Definition Multimedia Interface, Display Port, wireless HDMI, and/or wireless HD compliant techniques. Graphics processor 815 may be integrated with central processor 810 onto a single chip (i.e., SoC) as a graphics core or provided as part of chipset 805. In some implementations, graphics processor 815 may be a stand-alone card communicatively coupled to chipset 805. In various exemplary embodiments, graphics processor 815 and/or central processor 810 invokes or otherwise implements video motion instability mediation processes. Graphics processor 815 includes functionality to perform supplemental data embedding, and/or supplemental data recovery/extraction.

The data embedding processes predicated upon RLE-level stream processing as described herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In embodiments, HID 820 may include any television type monitor or display. HID 820 may include, for example, a computer display screen, touch screen display, video monitor, television-like device, and/or a television. HID 820 may be digital and/or analog. Under the control of one or more software applications 816, platform 802 may display user interface 822 on HID 820.

In embodiments, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., HID 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or HID 820. The present disclosure, however, is not limited to the elements or in the context shown or described herein.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 9:
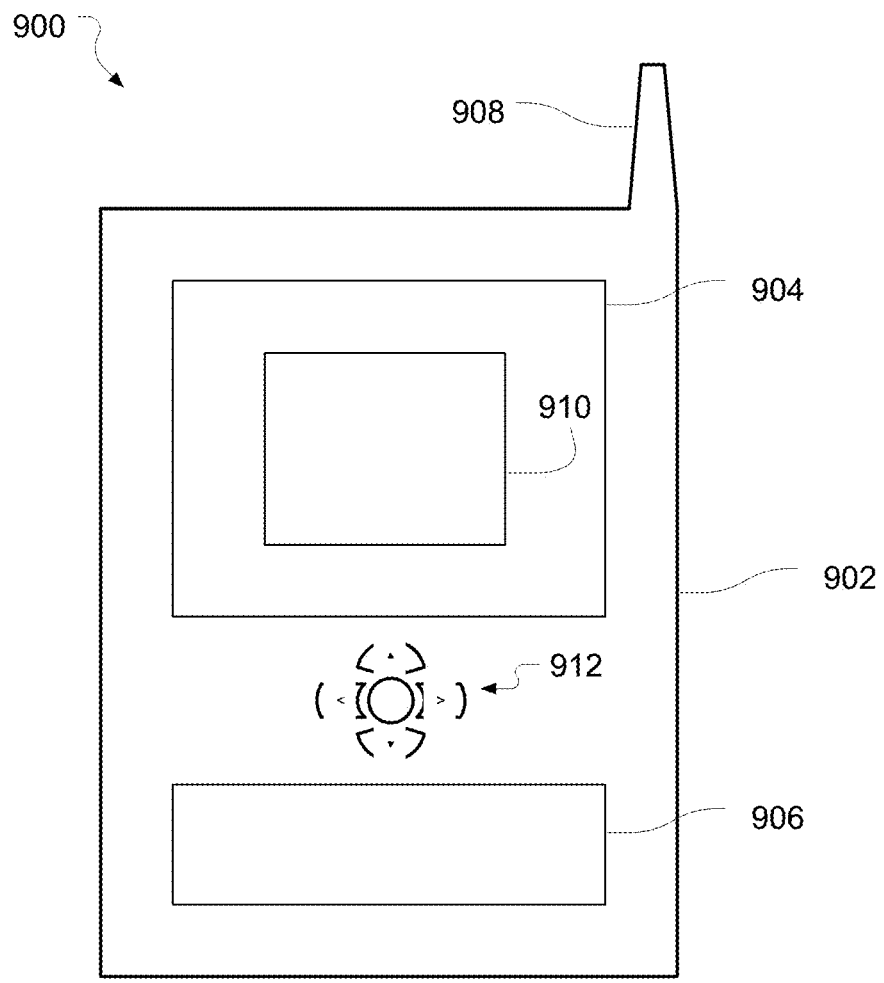
FIG. 9 is a diagram of an exemplary system, arranged in accordance with one or more embodiment.

As described above, system 800 may be embodied in varying physical styles or form factors. FIG. 9 illustrates embodiments of a small form factor device 900 in which system 800 may be further embodied. In embodiments, for example, device 900 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 1206 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown), or may be digitized by a voice recognition device. Embodiments are not limited in this context.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

In one or more first embodiment, a computer-implemented method for embedding supplemental data into a data stream includes determining a position, within a run length encoded (RLE) input data stream, of an input run-level pair specifying a non-zero run. The method further includes converting the input data stream to a supplemented data stream by reducing a run value of the input run-level pair, and adding to the input data stream a supplemental run-level pair, the supplemental run-level pair including a value associated with the supplemental data. The method further includes storing the supplemented data stream to a memory, or transmitting the supplemented data stream to a destination over a communication network.

In furtherance of the one or more first embodiment, the method further includes storing to a memory the position of the input run-level pair. The method further includes storing to a memory an amount by which the run value is reduced. The method further includes generating embedding data including at least the position of the supplemental run-level pair. The method further includes storing the embedding data to a memory, or transmitting the embedding data to the destination over the communication network.

In furtherance of the embodiment immediately above, the position of the input run-level pair is either included as part of the supplemental data added to the supplemented data stream or is included within the embedding data. The amount by which the run value is reduced is either included as part of the supplemental data added to the supplemented data stream or is included within the embedding data.

In furtherance of one or more of the embodiments above, the input data stream provides a first representation of a data block having N elements. The input run-level pair is one of a plurality of run-level pairs accounting for the N elements. The run value of the input run-level pair is reduced by r elements. The supplemental run-level pair accounts for the r elements. The supplemented data stream provides a second representation of the N elements of the data block.

In furtherance of one or more of the embodiments above, the input data stream provides a first representation of a data block having N elements. The input run-level pair is one of a plurality of run-level pairs accounting for the N elements. The run value of the input run-level pair is reduced by r elements. The supplemental run-level pair accounts for the r elements. Adding the supplemental run-level pair to the input data stream further comprises adding the supplemental run-level pair to a position within the supplemented data stream corresponding to a more significant location within the N elements. The method further comprises encrypting the embedding data to a different encryption level than the supplemented data stream.

In furtherance of one or more of the embodiments above, the input data stream provides a first representation of a data block having N elements. The input run-level pair is one of a plurality of run-level pairs accounting for the N elements. The run value of the input run-level pair is reduced by r elements. The supplemental run-level pair accounts for the r elements. Adding the supplemental run-level pair to the input data stream further comprises adding the supplemental run-level pair to a position within the supplemented data stream corresponding to a less significant location within the N elements.

In furtherance of the one or more first embodiments, the method further includes receiving a transform block associated with one or more image frames. The method further includes generating a data stream representation of the transform block by performing a transformation and quantization of data associated with the transform block. The method further includes generating the input data stream by run length encoding the data stream representation of the transform block. The method further includes entropy encoding the supplemented data stream. The supplemental data includes at least one of: closed caption data associated with the one or more image frames; scrambling data inserted at positions within the supplemented data stream corresponding to more significant positions of the data stream representation of the transform block; or hidden data inserted at positions within the supplemented data stream corresponding to less significant positions of the data stream representation of the transform block.

In furtherance of the one or more first embodiments, the method further includes receiving a transform block associated with one or more image frames. The method further includes generating one or more transform blocks from the graphics data. The method further includes generating a data stream representation of the one or more transform blocks by performing a transformation and quantization of data associated with each transform block, the data stream representation associated with N elements in each transform block. The method further includes generating the input data stream by run length encoding the data stream representation of the N elements of each transform block. Determining the position of the input run-level pair further comprises determining position indicators P of run-level pairs in a run-level pair set X specifying non-zero runs. Reducing the run value further comprises reducing a run value of each run-level pair i in the set X by an amount $r_i$. Adding the supplemental run-level pair further comprises generating a run-level pair set D including the supplemental data and accounting for the sum of $r_i$ over the set X, and generating the supplemented stream from the input data stream by adding the set D at position indicators Q within the supplemented stream. The method further includes entropy encoding the supplemented data stream.

In furtherance of the embodiment immediately above, the supplemental data added within portion of the supplemented data stream corresponding to a first transform block specifies position indicators P and a set R of all values of $r_i$ in the set X associated with a portion of the supplemented data stream corresponding to the first transform block.

In furtherance of the embodiment immediately above, the supplemental data added within portion of the supplemented data stream corresponding to a first transform block specifies position indicators Q associated with a portion of the supplemented data stream corresponding to a second transform block.

In furtherance of one or more of the embodiments above, wherein the supplemental data added within portion of the supplemented data stream corresponding to a first transform block specifies closed caption (CC) data associated with the one or more image frames.

In one or more second embodiments, a computer-implemented method for recovering supplemental data from a data stream includes receiving a supplemented data stream having a plurality of run length encoded (RLE) run-level pairs. The method further includes receiving a first position identifying a first of the run-level pairs. The method further includes reverting the supplemented data stream to an input data stream by: extracting the first of run-level pairs from the supplemented data stream; determining a second position identifying a second of the run-level pairs; determining an amount by which a run value of a second of the run-level pairs in the supplemented data stream is to be increased; incrementing the run value of the second of the run-level pairs by the determined amount; and outputting the input data stream to a run-level decoder subsequent to the extracting and incrementing.

In furtherance of the embodiment immediately above, the method further includes receiving a secondary data stream. The method further includes determining the first position from data included in the secondary stream. Determining the second position and the amount by which the run value is to be increased further comprises: determining at least one of the second position and the amount by which the run value is to be increased from data included in the secondary data stream; or determining at least one of the second position and the amount by which the run value is to be increased based at least in part on data included in the first run-level pair extracted from the supplemented data stream.

In furtherance of the embodiment immediately above, the method further includes receiving a compressed data stream. The method further includes entropy decoding the compressed data stream into the supplemented data stream. The method further includes obtaining the first position at one of a set of position indicators Q where a set T of supplemental run-level pairs is located within the supplemented data stream. The method further includes obtaining position indicators P where a set X of reduced run-level pairs is located. The method further includes obtaining a set R of all values of $r_i$ in the set X by which a run value $X_i$ is reduced. Extracting the first of the run-level pairs further comprises removing from the supplemented data stream a set of run-level pairs D at position indicators Q, the set D accounting for the sum of $r_i$ over the set X. Incrementing the run value of the second of the run-level pairs further comprises increasing the run value of each run-level pair i in the set X by the amount $r_i$. The method further includes generating an output data stream by run-length decoding the input data stream. The method further includes generating one or more macroblocks by performing an inverse quantization and transformation of the input data stream associated with N elements for each transform block. The method further includes generating one or more image frames from the one or more transform blocks.

In one or more third embodiments, a video encoding system includes a video compression module to generate an RLE input data stream from one or more image frames. The system further includes a dynamic data-embedding module coupled to an output of the video compression module, the data-embedding module including logic circuitry to: receive a embedding data; receive a run length encoded (RLE) input data stream; determine a position, within the input data stream, of an input run-level pair specifying a non-zero run; and convert the input data stream to a supplemented data stream by: reducing a run value of the input run-level pair; and adding to the input data stream a supplemental run-level pair, the supplemental run-level pair including a value determined from the embedding data. The system further includes an entropy encoder coupled to an output of the data-embedding module to encode the supplemented data stream. The system further includes a memory communicatively coupled to an output of the entropy encoder, the memory to store the entropy encoded supplemented data stream.

In furtherance of the one or more third embodiments, the system further includes a transmitter to transmit at least the entropy encoded supplemented data stream to a destination over a communication network. The data-embedding module further includes logic circuitry to: store to a memory the position of the input run-level pair; store to a memory an amount by which the run value is reduced; and generate embedding data including at least the position of the supplemental run-level pair. The transmitter is further to transmit the embedding data to the destination over the communication network.

In one or more fourth embodiments, a video decoding system includes a video decompression module to generate one or more image frames from an RLE input data streams. The system further includes a data recovery module coupled to an input of the video decompression module, the data recovery module including logic circuitry to: receive a supplemented data stream having a plurality of run length encoded (RLE) run-level pairs; receive a first position identifying a first of the run-level pairs; revert the supplemented data stream to an input data stream by: extracting the first of run-level pairs from the supplemented data stream; determining a second position identifying a second of the run-level pairs; determining an amount by which a run value of a second of the run-level pairs in the supplemented data stream is to be increased; incrementing the run value of the second of the run-level pairs by the determined amount; and output the input data stream.

In furtherance of the one or more fourth embodiments, the data recovery module further includes logic circuitry to receive a secondary data stream, and to determine the first position from data included in the secondary stream. Determining the second position and the amount by which the run value is to be increased further includes determining at least one of the second position and the amount by which the run value is to be increased from data included in the secondary data stream, or determining at least one of the second position and the amount by which the run value is to be increased based at least in part on data included in the first run-level pair extracted from the supplemented data stream.

In one or more fifth embodiment, a codec is to perform the computer-implemented method for embedding supplemental data into a data stream in any of the above first embodiments, and perform the computer-implemented method for recovering supplemental data from a data stream in any of the above second embodiments.

In one or more sixth embodiment, at least one machine-readable medium comprises instructions stored thereon, that in response to being executed by a computing device, cause the computing device to perform a method including determining a position, within a run length encoded (RLE) input data stream, of an input run-level pair specifying a non-zero run. The method further including converting the input data stream to a supplemented data stream by: reducing a run value of the input run-level pair; and adding to the input data stream a supplemental run-level pair, the supplemental run-level pair including a value associated with the supplemental data. The method further including storing the supplemented data stream to a memory, or transmitting the supplemented data stream to a destination over a communication network.

In furtherance of the one or more sixth embodiment, the medium further comprises instructions, which when executed by the computing device, cause the computing device to perform the method further including receiving a transform block associated with one or more image frames. The method further including generating one or more transform blocks from the graphics data. The method further including generating a data stream representation of the one or more transform blocks by performing a transformation and quantization of data associated with each transform block, the data stream representation associated with N elements in each transform block. The method further including generating the input data stream by run length encoding the data stream representation of the N elements of each transform block. Determining the position of the input run-level pair further comprises determining position indices P of run-level pairs in a run-level pair set X specifying non-zero runs. Reducing the run value further comprises reducing a run value of each run-level pair i in the set X by an amount $r_i$. Adding the supplemental run-level pair further comprises: generating a set of run-level pairs D including the supplemental data and accounting for the sum of $r_i$ over the set X; and generating the supplemented stream from the input data stream by adding the set D at position indices Q within the supplemented stream. The method further including entropy encoding the supplemented data stream.

In one or more seventh embodiment, at least one machine-readable medium comprises instructions stored thereon, that in response to being executed by a computing device, cause the computing device to perform a method including receiving a supplemented data stream having a plurality of run length encoded (RLE) run-level pairs. The method further includes receiving a first position identifying a first of the run-level pairs. The method further includes reverting the supplemented data stream to an input data stream by: extracting the first of run-level pairs from the supplemented data stream; determining a second position identifying a second of the run-level pairs; determining an amount by which a run value of a second of the run-level pairs in the supplemented data stream is to be increased; incrementing the run value of the second of the run-level pairs by the determined amount; and outputting the input data stream to a run-level decoder subsequent to the extracting and incrementing.

In furtherance of the one or more sixth embodiment, the medium further comprises instructions, which when executed by the computing device, cause the computing device to perform the method further including receiving a compressed data stream. The method further including entropy decoding the compressed data stream into the supplemented data stream. The method further including obtaining the first position at one of a set of position indicators Q where a set T of supplemental run-level pairs is located within the supplemented data stream. The method further including obtaining position indicators P where a set X of reduced run-level pairs is located. The method further including obtaining a set R of all values of $r_i$ in the set X by which a run value $X_i$ is reduced. Extracting the first of the run-level pairs further comprises removing from the supplemented data stream a set of run-level pairs D at positions indicators Q, the set D accounting for the sum of $r_i$ over the set X. Incrementing the run value of the second of the run-level pairs further comprises increasing the run value of each run-level pair i in the set X by the amount $r_i$. The method further includes generating an output data stream by run-length decoding the input data stream. The method further includes generating one or more macroblocks by performing an inverse quantization and transformation of the input data stream associated with N elements for each transform block. The method further includes generating one or more image frames from the one or more transform blocks.

In one or more seventh embodiment, at least one machine-readable medium comprises instructions stored thereon, that in response to being executed by a computing device, cause the computing device to perform any of the first or second embodiments.

In one or more eighth embodiment, a video encoding system includes a video compression module to generate an RLE input data stream from one or more image frames. The system further includes a dynamic data-embedding module coupled to an output of the video compression module, the data-embedding module including logic circuitry to perform any of the first embodiments. The system further includes an entropy encoder coupled to an output of the data-embedding module to encode the supplemented data stream. The system further includes a memory communicatively coupled to an output of the entropy encoder, the memory to store the entropy encoded supplemented data stream.

In one or more ninth embodiment, a video decoding system includes a video decompression module to generate one or more image frames from an RLE input data stream. The system further includes a data recovery module coupled to an input of the video compression module, the data recovery module including logic circuitry to perform any of the second embodiments and to output the input data stream to a run-level decoder subsequent to the extracting and incrementing.

In one or more tenth embodiment, a video encoding system includes a search means to determine a position, within a run length encoded (RLE) input data stream, of an input run-level pair specifying a non-zero run. The system further includes a data embedding means coupled to the search means, the data embedding means to convert the input data stream to a supplemented data stream by: reducing a run value of the input run-level pair; and adding to the input data stream a supplemental run-level pair, the supplemental run-level pair including a value associated with the supplemental data. The system further includes a storage means coupled to the data embedding means, the storage means to store the supplemented data stream to a memory, or a transmitting means to transmit the supplemented data stream to a destination over a communication network.

In one or more eleventh embodiment, a video decoding system includes a decompressing means to generate one or more image frames from an RLE input data stream. The system includes an embedded data extracting means coupled to an input of the decompressing means, the embedded data extracting means to: receive a supplemented data stream having a plurality of run length encoded (RLE) run-level pairs; receive a first position identifying a first of the run-level pairs; revert the supplemented data stream to an input data stream by: extracting the first of run-level pairs from the supplemented data stream; determining a second position identifying a second of the run-level pairs; determining an amount by which a run value of a second of the run-level pairs in the supplemented data stream is to be increased; incrementing the run value of the second of the run-level pairs by the determined amount; and output the input data stream to the decompressing means.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented method for embedding supplemental data into a compressed video data stream, the method comprising:

receiving a block associated with an image frame;

generating a data stream of quantized coefficients representing the block by performing a frequency domain transformation and a quantization of coefficients associated with the transformation;

generating a run length encoded (RLE) input data stream by run length encoding the data stream of quantized coefficients;

determining a position, within the RLE input data stream, of an input run-level pair specifying a non-zero run that encodes quantized coefficients associated with a frequency satisfying a predetermined threshold;

converting the input data stream to a supplemented data stream by:
  reducing a run value of the input run-level pair; and
  adding to the input data stream a supplemental run-level pair at a predetermined position relative to the position of the input run-level pair, the supplemental run-level pair including a value associated with the supplemental data;

entropy encoding the supplemented data stream; and storing the entropy encoded supplemented data stream to a memory, or transmitting the entropy encoded supplemented data stream to a destination over a communication network.

2. The method of claim 1, further comprising:

storing to a memory the position of the input run-level pair;

storing to a memory an amount by which the run value is reduced;

generating embedding data including at least the position of the supplemental run-level pair; and storing the embedding data to a memory, or transmitting the embedding data to the destination over the communication network.

3. The method of claim 2, wherein:

the predetermined position is associated with quantized coefficients of less significance than those represented by the input run-level pair;

the position of the input run-level pair is either included as part of the supplemental data added to the supplemented data stream or is included within the embedding data; and the amount by which the run value is reduced is either included as part of the supplemental data added to the supplemented data stream or is included within the embedding data.

4. The method of claim 2, wherein:

the input data stream provides a first representation of a macroblock having N elements;

the input run-level pair is one of a plurality of run-level pairs accounting for the N elements;

the run value of the input run-level pair is reduced by r elements;

the supplemental run-level pair accounts for the r elements; and the supplemented data stream provides a second representation of the N elements of the macroblock.

5. The method of claim 2, wherein:

the input data stream provides a first representation of a macroblock having N elements;

the input run-level pair is one of a plurality of run-level pairs accounting for the N elements;

the run value of the input run-level pair is reduced by r elements;

the supplemental run-level pair accounts for the r elements;

adding the supplemental run-level pair to the input data stream further comprises adding the supplemental run-level pair to a position within the supplemented data stream corresponding to a more significant location within the N elements; and the method further comprises:

encrypting the embedding data to a different encryption level than the supplemented data stream.

6. The method of claim 2, wherein:

the input data stream provides a first representation of a macroblock having N elements;

the input run-level pair is one of a plurality of run-level pairs accounting for the N elements;

the run value of the input run-level pair is reduced by r elements;

the supplemental run-level pair accounts for the r elements;

adding the supplemental run-level pair to the input data stream further comprises adding the supplemental run-level pair to the position within the supplemented data stream that encodes a quantized coefficient of highest frequency.

7. The method of claim 1, wherein the supplemental data includes scrambling data inserted at the position within the supplemented data stream that encodes a quantized coefficient of lowest frequency.

8. The method of claim 1, wherein:

determining the position of the input run-level pair further comprises determining position indicators P of run-level pairs in a run-level pair set X specifying non-zero runs;

reducing the run value further comprises reducing a run value of each run-level pair i in the set X by an amount $r_i$;

adding the supplemental run-level pair further comprises:

generating a run-level pair set D including the supplemental data and accounting for the sum of $r_i$ over the set X; and generating the supplemented stream from the input data stream by adding the set D at position indicators Q within the supplemented stream; and entropy encoding the supplemented data stream.

9. The method of claim 8, wherein the supplemental data added within portion of the supplemented data stream corresponding to a first block specifies position indicators P and a set R of all values of $r_i$ in the set X associated with a portion of the supplemented data stream corresponding to the first block.

10. The method of claim 9, wherein the supplemental data added within portion of the supplemented data stream corresponding to the first block specifies position indicators Q associated with a portion of the supplemented data stream corresponding to a second block.

11. The method of claim 9, wherein the supplemental data added within portion of the supplemented data stream corresponding to the first block specifies closed caption (CC) data associated with the one or more image frames.

12. A computer-implemented method for recovering supplemental data from a compressed video data stream, the method comprising:

receiving a compressed data stream;

entropy decoding a portion of the compressed video data stream into a supplemented data stream having a plurality of run length encoded (RLE) run-level pairs;

receiving a first position identifying a first of the run-level pairs;

reverting the supplemented data stream to an input data stream by:

extracting the first of run-level pairs from the supplemented data stream;

determining a second position in the supplemented data stream identifying a second of the run-level pairs;

determining an amount by which a run value of a second of the run-level pairs in the supplemented data stream is to be increased;

incrementing the run value of the second of the run-level pairs by the determined amount;

generating an output data stream by run-length decoding the input data stream subsequent to the extracting and incrementing;

generating a macroblock by performing an inverse quantization and frequency transformation of the input data stream associated with N elements for each macroblock; and generating an image frame that includes the macroblock.

13. The method of claim 12, further comprising:

receiving a secondary data stream;

determining the first position from data included in the secondary stream; and wherein:

determining the second position and the amount by which the run value is to be increased further comprises:

determining at least one of the second position and the amount by which the run value is to be increased from data included in the secondary data stream; or determining at least one of the second position and the amount by which the run value is to be increased based at least in part on data included in the first run-level pair extracted from the supplemented data stream.

14. The method of claim 12, further comprising:

obtaining the first position at one of a set of position indicators Q where a set T of supplemental run-level pairs is located within the supplemented data stream;

obtaining position indicators P where a set X of reduced run-level pairs is located;

obtaining a set R of all values of $r_i$ in the set X by which a run value X is reduced; and wherein:

extracting the first of the run-level pairs further comprises removing from the supplemented data stream a set of run-level pairs D at position indicators Q, the set D accounting for the sum of $r_i$ over the set X; and incrementing the run value of the second of the run-level pairs further comprises increasing the run value of each run-level pair i in the set X by the amount $r_i$.

15. At least one non-transitory machine-readable medium comprising instructions stored thereon, that in response to being executed by a computing device, cause the computing device to perform a video data compression method comprising:

receiving a block associated with an image frame;

generating a data stream of quantized coefficients representing the block by performing a frequency domain transformation and a quantization of coefficients associated with the transformation;

generating a run length encoded (RLE) input data stream by run length encoding the data stream of quantized coefficients;

determining a position, within the RLE input data stream, of an input run-level pair specifying a non-zero run that encodes quantized coefficients associated with a frequency satisfying a predetermined threshold;

converting the input data stream to a supplemented data stream by:

reducing a run value of the input run-level pair; and adding to the input data stream a supplemental run-level pair at a position associated with quantized coefficients of less significance than those represented by the input run-level pair, the supplemental run-level pair including a value associated with the supplemental data;

entropy encoding the supplemented data stream; and storing the entropy encoded supplemented data stream to a memory, or transmitting the entropy encoded supplemented data stream to a destination over a communication network.

16. The machine-readable medium of claim 15, the medium further comprising instructions, which when executed by the computing device, cause the computing device to perform the method further comprising:

generating the input data stream by run length encoding the data stream representation of N elements of the block; and wherein:

determining the position of the input run-level pair further comprises determining position indices P of run-level pairs in a run-level pair set X specifying non-zero runs;

reducing the run value further comprises reducing a run value of each run-level pair i in the set X by an amount $r_i$; and adding the supplemental run-level pair further comprises:

generating a set of run-level pairs D including the supplemental data and accounting for the sum of $r_i$ over the set X; and generating the supplemented stream from the input data stream by adding the set D at position indices Q within the supplemented stream.

* * * * *